(12) United States Patent
Liu et al.

(10) Patent No.: US 8,962,132 B2
(45) Date of Patent: Feb. 24, 2015

(54) SOLID POLYMER ELECTROLYTE COMPOSITE MEMBRANE COMPRISING A POROUS SUPPORT AND A SOLID POLYMER ELECTROLYTE INCLUDING A DISPERSED REDUCED NOBLE METAL OR NOBLE METAL OXIDE

(75) Inventors: Han Liu, Lutherville-Timonium, MD (US); Cortney K. Mittelsteadt, Wayland, MA (US); Timothy J. Norman, Acton, MA (US); Arthur E. Griffith, Lynn, MA (US); Anthony B. LaConti, Lynnfield, MA (US)

(73) Assignee: Giner, Inc., Newton, MA (US)

( * ) Notice: Subject to any disclaimer, the term of this patent is extended or adjusted under 35 U.S.C. 154(b) by 412 days.

(21) Appl. No.: 12/924,751

(22) Filed: Oct. 4, 2010

(65) Prior Publication Data

US 2011/0104474 A1    May 5, 2011

Related U.S. Application Data

(63) Continuation-in-part of application No. 10/970,685, filed on Oct. 21, 2004, now Pat. No. 7,807,063.

(60) Provisional application No. 60/613,769, filed on Sep. 28, 2004.

(51) Int. Cl.
| | | |
|---|---|---|
| *B32B 3/26* | (2006.01) | |
| *B32B 3/06* | (2006.01) | |
| *B32B 5/14* | (2006.01) | |
| *B32B 3/00* | (2006.01) | |
| *H01B 1/00* | (2006.01) | |
| *C25B 13/02* | (2006.01) | |
| *H01G 9/00* | (2006.01) | |
| *H01G 9/025* | (2006.01) | |
| *H01G 9/022* | (2006.01) | |
| *H01G 11/56* | (2013.01) | |
| *H01M 4/88* | (2006.01) | |
| *H01M 8/10* | (2006.01) | |

(52) U.S. Cl.
CPC ............ *C25B 13/02* (2013.01); *H01G 9/0036* (2013.01); *H01G 9/025* (2013.01); *H01G 9/038* (2013.01); *H01G 11/56* (2013.01); *H01M 4/881* (2013.01); *H01M 8/1039* (2013.01);
(Continued)

(58) Field of Classification Search
CPC ...... C25B 13/02; H01G 9/0036; H01G 9/025; H01G 9/038; H01G 11/56; H01M 4/881; H01M 8/1039; H01M 8/1051; H01M 8/106; H01M 8/1062; H01M 8/1076
USPC .......... 428/304.4, 306.6, 308.4, 315.9, 316.6; 252/500
See application file for complete search history.

(56) References Cited

U.S. PATENT DOCUMENTS 3,282,875 A     11/1966  Connolly et al.
3,424,619 A  *   1/1969  Hever et al. .................... 429/433
(Continued)

FOREIGN PATENT DOCUMENTS

WO    WO 2004/045750 A1    6/2004

*Primary Examiner* — Victor Chang
(74) *Attorney, Agent, or Firm* — Kriegsman & Kriegsman

(57) ABSTRACT

A solid polymer electrolyte composite membrane and method of manufacturing the same. According to one embodiment, the composite membrane comprises a thin, rigid, dimensionally-stable, non-electrically-conducting support, the support having a plurality of cylindrical, straight-through pores extending perpendicularly between opposing top and bottom surfaces of the support. The pores are unevenly distributed, with some or no pores located along the periphery and more pores located centrally. The pores are completely filled with a solid polymer electrolyte, the solid polymer electrolyte including a dispersed reduced noble metal or noble metal oxide. The solid polymer electrolyte may also be deposited over the top and/or bottom surfaces of the support.

31 Claims, 4 Drawing Sheets

(52) U.S. Cl.
CPC ........... *H01M 8/1051* (2013.01); *H01M 8/106* (2013.01); *H01M 8/1062* (2013.01); *H01M 8/1076* (2013.01); *Y02E 60/13* (2013.01); *Y02E 60/522* (2013.01)
USPC .................. 428/304.4; 428/306.6; 428/308.4; 428/315.9; 428/316.6; 252/500

(56) References Cited

U.S. PATENT DOCUMENTS

| | | | |
|---|---|---|---|
| 3,972,727 | A | 8/1976 | Cohn |
| 4,215,183 | A | 7/1980 | MacLeod |
| 4,470,889 | A | 9/1984 | Ezzell et al. |
| 4,478,695 | A | 10/1984 | Ezzell et al. |
| 5,569,855 | A | 10/1996 | Schomburg et al. |
| 6,350,389 | B1 | 2/2002 | Fujishima et al. |
| 6,492,431 | B1 | 12/2002 | Cisar |
| 6,500,319 | B2 | 12/2002 | LaConti et al. |
| 6,635,384 | B2 | 10/2003 | Bahar et al. |
| 6,793,711 | B1 | 9/2004 | Sammells |
| 2002/0182482 | A1 | 12/2002 | Hockaday et al. |
| 2003/0138656 | A1 | 7/2003 | Sparks |
| 2004/0126638 | A1 | 7/2004 | Chen et al. |
| 2005/0026030 | A1 | 2/2005 | Mardilovich et al. |
| 2005/0074651 | A1 | 4/2005 | Kidai et al. |
| 2005/0095486 | A1 | 5/2005 | Hamamoto et al. |
| 2005/0263452 | A1 | 12/2005 | Jacobson |
| 2006/0065521 | A1 | 3/2006 | Liu et al. |
| 2006/0065522 | A1 | 3/2006 | Liu et al. |
| 2006/0180796 | A1* | 8/2006 | Adachi et al. ................. 252/500 |
| 2006/0183011 | A1 | 8/2006 | Mittelsteadt et al. |

* cited by examiner

SOLID POLYMER ELECTROLYTE COMPOSITE MEMBRANE COMPRISING A POROUS SUPPORT AND A SOLID POLYMER ELECTROLYTE INCLUDING A DISPERSED REDUCED NOBLE METAL OR NOBLE METAL OXIDE

CROSS-REFERENCE TO RELATED APPLICATIONS

The present application is a continuation-in-part of U.S. patent application Ser. No. 10/970,685, inventors Han Liu et al., filed Oct. 21, 2004, now U.S. Pat. No. 7,807,063 which in turn claims the benefit under 35 U.S.C. 119(e) of U.S. Provisional Patent Application Ser. No. 60/613,769, filed Sep. 28, 2004, both of which are incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. DE-FG02-05ER84322 awarded by the Department of Energy.

BACKGROUND OF THE INVENTION

The present invention relates generally to solid polymer electrolyte membranes of the type suitable for use in electrochemical devices and relates more particularly to a novel such membrane.

Electrochemical devices of the type comprising a solid polymer electrolyte membrane (PEM) sandwiched between a pair of electrodes are well-known, such electrochemical devices finding applications as, for example, fuel cells, electrolyzers, sensors, gas concentrators, gas compressors, supercapacitors, ultracapacitors and industrial electrochemical process units.

A common type of solid polymer electrolyte membrane consists of a homogeneous perfluorosulfonic acid (PFSA) polymer, said PFSA polymer being formed by the copolymerization of tetrafluoroethylene and perfluorovinylether sulfonic acid. See e.g., U.S. Pat. No. 3,282,875, inventors Connolly et al., issued Nov. 1, 1966; U.S. Pat. No. 4,470,889, inventors Ezzell et al., issued Sep. 11, 1984; U.S. Pat. No. 4,478,695, inventors Ezzell et al., issued Oct. 23, 1984; U.S. Pat. No. 6,492,431, inventor Cisar, issued Dec. 10, 2002, all of which are incorporated herein by reference. A commercial embodiment of a perfluorosulfonic acid polymer PEM is available from DuPont (Wilmington, Del.) as NAFION® PFSA polymer.

Although PFSA PEMs function in a generally satisfactory manner in electrochemical devices, there nonetheless remains room for improvement in certain properties of PFSA PEMs. For example, one common difficulty associated with PFSA PEMs is a lack of mechanical strength, resulting in a tendency for the PFSA PEMs to tear, especially when being handled (such as during assembly of an electrochemical cell) or in stressed areas where compression is applied thereto (such as in peripheral areas of PEMs sealed under pressure to other electrochemical cell components). Such a lack of mechanical strength also often leads to electrical shorting, which results in premature failures during cell operation as the typical porous electrodes in contact with the PEM have a tendency to penetrate the softened PEM. This problem of shorting is even greater when the membrane is made thin (e.g., less than 25 microns) in order to decrease membrane resistance.

Because the tendency to tear and to short is greatest when the PFSA PEMs are wet (especially at elevated temperatures) and because the PFSA PEMs must be wet in order to function properly, one approach to this problem has been to assemble electrochemical cells with dry PEMs and then to subject the PEMs to a humidification process. This approach, however, has its own shortcomings. One such shortcoming is that the dry assembly requires special moisture-free facilities, such as a "dry room." Another such shortcoming is that the humidification process is time-consuming. Still another such shortcoming is that the humidification process typically results in the PEM swelling in a non-uniform manner, thereby creating stress in some areas of the PEM, as well as in other components of the cell that are in contact with the PEM, and introducing irregularities in the contact pressure applied over the entire active surface area of the PEM. (When the contact pressure is not uniform over the entire active surface area of the PEM, the performance of the electrochemical cell is adversely affected.) As can readily be appreciated, such irregularities are amplified where humidification is applied to a plurality of PEM-containing fuel cells arranged in a stack.

Moreover, if the PEM is subjected to variable conditions of humidity (e.g., alternating wet and dry intervals during periods of use and non-use, respectively), the membrane will undergo additional dimensional changes as it swells when wet and shrinks when dry. Such dimensional changes cause further stress to the PEM and to the other cell components, all of which are tightly packed together. If sufficiently great, such stress results in damage to the PEM and/or to the cell components in contact therewith. Pinholes/microcracks have a tendency to form along the edges where one side of the membrane is heavily compressed by the fixture while the other side can still partially swell.

One approach that has been taken to address the aforementioned problem of low mechanical strength of PFSA PEMs has been to cross-link the membrane polymer. Such cross-linking reduces the swelling of the membrane when wet which, in turn, reduces the deterioration of the mechanical strength of the membrane when wet. Unfortunately, however, such cross-linking tends to make the membrane undesirably brittle under dry conditions.

Another approach to this problem is disclosed in U.S. Pat. No. 6,635,384, inventors Bahar et al., which issued Oct. 21, 2003, and which is incorporated herein by reference. In the aforementioned '384 patent, there is described a composite membrane that comprises a microporous sheet, said microporous sheet preferably being an expanded polytetrafluoroethylene (ePTFE) membrane, said ePTFE membrane preferably being formed by stretching a sheet of polytetrafluoroethylene (PTFE) until pores are formed therein. The structure defining the pores of the microporous sheet is then at least partially covered with a functional material selected from (i) inorganic particulate; (ii) metal; and (iii) an organic polymer. In addition, the pores of the sheet are then at least partially filled with polymer electrolyte selected from (i) polymer compositions that contain metal salts; (ii) polymeric gels that contain electrolyte; and (iii) ion exchange resins, such as PFSA.

One disadvantage that has been noted by the present inventors regarding the foregoing composite membrane is that the pores of the expanded polytetrafluoroethylene (ePTFE) sheet tend to follow a tortuous pathway between opposing surfaces of the ePTFE sheet, as opposed to following a direct or straight pathway between opposing surfaces. As a result of these tortuous pathways, protons conducted through the pores (by means of the polymer electrolyte that is disposed within the pores) have to travel considerably longer pathways through the membrane than merely the thickness of the membrane. Such longer pathways result in a reduction in the conductivity of the membrane and an increase in the resistivity of the membrane.

Another disadvantage that has been noted by the present inventors regarding the foregoing composite membrane is that a microporous sheet of ePTFE possesses only slightly better mechanical strength than a PFSA PEM. Consequently, the foregoing composite membrane is not significantly stronger than a PFSA PEM and is subject to the same types of shortcomings discussed above in connection with PFSA PEMs.

Still another disadvantage that has been noted by the present inventors regarding the foregoing composite membrane is that the stretching process that is used to expand the PTFE sheet to create the desired pores tends to result in a fairly uniform yet random distribution of pores throughout the sheet and cannot be tailored to control the positioning or concentration of pores in particular regions of the sheet. This is unfortunate because certain regions of the membrane, such as the membrane active area edges/corners or the membrane contact area with the current collector, are typically subjected to greater stresses than other regions. Consequently, pores in these regions of high stress undesirably diminish membrane strength in those regions where membrane strength is needed most.

SUMMARY OF THE INVENTION

It is an object of the present invention to provide a novel solid polymer electrolyte membrane of the type that is suitable for use in electrochemical devices, such as, but not limited to, fuel cells, electrolyzers, sensors, gas concentrators, gas compressors, supercapacitors, ultracapacitors and industrial electrochemical process units.

It is another object of the present invention to provide a solid polymer electrolyte membrane of the type described above that overcomes at least some of the drawbacks discussed above in connection with existing solid polymer electrolyte membranes.

Therefore, according to one aspect of the invention, there is provided a solid polymer electrolyte composite membrane, said solid polymer electrolyte composite membrane comprising (a) a non-electrically-conductive support, said non-electrically-conductive support having opposing top and bottom surfaces and a plurality of pores in said non-electrically-conductive support, said pores extending directly from said top surface to said bottom surface; and (b) at least some of said pores being at least partially filled with a solid polymer electrolyte, said solid polymer electrolyte comprising a dispersed reduced noble metal or noble metal oxide.

The non-electrically-conductive support may be a polymeric material, such as a polyimide membrane. The support may have a thickness of about 5 µm to 75 µm, and the pores may have a diameter of about 0.1 µm to 200 µm, preferably 0.5 µM to 50 µm, and may be arranged in a defined pattern, such as in a uniform hexagonal pattern, or may be arranged in a pattern in which some or no pores are located in areas of higher membrane stress, such as in a peripheral portion of the support, and more pores are located in an area of lower membrane stress, such as in a non-peripheral portion of the support. The solid polymer electrolyte may completely fill the pores of the support and may additionally be applied to one or both of the top and bottom surfaces of the support. Alternatively, the top and/or bottom surfaces of the support and/or a portion of the pores may be filled with a different solid polymer electrolyte than is used to fill the pores.

The present invention is also directed to a method of preparing a solid polymer electrolyte composite membrane. According to one aspect of the invention, such a method comprises the steps of (a) providing a non-electrically-conductive support, said non-electrically-conductive support having opposing top and bottom surfaces; (b) creating a plurality of pores in said non-electrically-conductive support, said pores extending directly from said top surface to said bottom surface; and (c) at least partially filling at least some of said pores with a first solid polymer electrolyte, said first solid polymer electrolyte comprising a dispersed reduced noble metal or noble metal oxide.

The pores in the non-electrically-conductive support may be created by plasma etching, laser micromachining, micromolding, chemical etching, or a combination thereof and may be unevenly distributed in said non-electrically-conductive support, with at least some of said pores being located in a peripheral portion of said non-electrically-conductive support and at least some of said pores being located in a non-peripheral portion of said non-electrically-conductive support, said pores being located in a greater concentration in said non-peripheral portion than in said peripheral portion.

According to another aspect of the invention, there is provided a method of preparing a solid polymer electrolyte composite membrane, said method comprising the steps of (a) providing a first non-electrically-conductive porous support, said first non-electrically-conductive porous support having opposing top and bottom surfaces and a plurality of pores extending directly from said top surface to said bottom surface; (b) providing a first solid polymer electrolyte film; (c) providing a second solid polymer electrolyte film; (d) positioning said first non-electrically-conductive porous support on top of said first solid polymer electrolyte film and said second solid polymer electrolyte film on top of said first non-electrically-conductive porous support to form a stack; and (e) compressing said stack under elevated temperatures until at least some of said pores in said first non-electrically-conductive porous support become at least partially filled with at least one of said first solid polymer electrolyte film and said second solid polymer electrolyte film.

The pores in said first non-electrically-conductive porous support may be unevenly distributed, with at least some of said pores being located in a peripheral portion of said first non-electrically-conductive porous support and at least some of said pores being located in a non-peripheral portion of said first non-electrically-conductive porous support, said pores being located in a greater concentration in said non-peripheral portion than in said peripheral portion. In addition, at least one of said first solid polymer electrolyte film and said second solid polymer electrolyte film may comprise a dispersed reduced noble metal or noble metal oxide.

The present invention is also directed to membrane electrode assemblies incorporating the above-described composite membranes and to electrochemical devices incorporating the above-described composite membranes, such electrochemical devices including, but not being limited to, fuel cells, electrolyzers, gas concentrators, gas compressors, sensors, supercapacitors, ultracapacitors, and industrial electrochemical process units.

For purposes of the present specification and claims, it is to be understood that certain relational terms used herein, such as "above," "below," "top," "bottom," "over," "under," "in front of," or "behind," when used to denote the relative positions of two or more components of an electrochemical device are used to denote such relative positions in a particular orientation and that, in a different orientation, the relationship of said components may be reversed or otherwise altered.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF PREFERRED EMBODIMENTS

Figure 1:
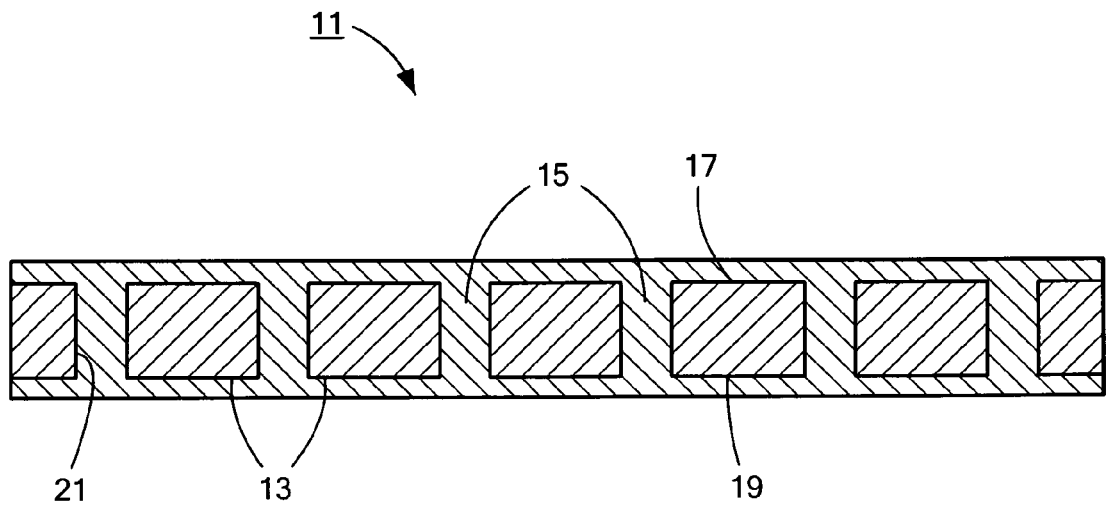
FIG. 1 is a schematic section view of a first embodiment of a solid polymer electrolyte composite membrane constructed according to the teachings of the present invention.

Referring now to FIG. 1, there is shown a schematic section view of a first embodiment of a solid polymer electrolyte composite membrane constructed according to the teachings of the present invention, said solid polymer electrolyte composite membrane being represented generally by reference numeral 11.

Composite membrane 11 comprises a non-electrically-conductive support 13 and a solid polymer electrolyte 15, support 13 being impregnated with solid polymer electrolyte 15.

Figure 2A:
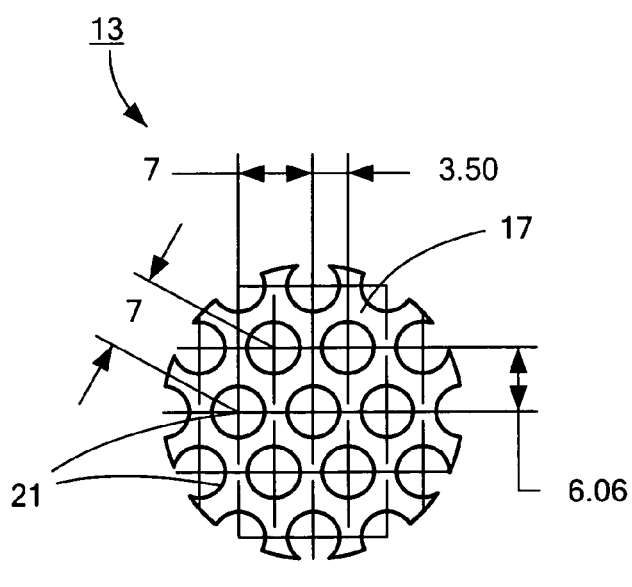
FIGS. 2(a) and 2(b) are fragmentary top and fragmentary perspective views, respectively, of the non-electrically-conductive support shown in FIG. 1.
Figure 2B:
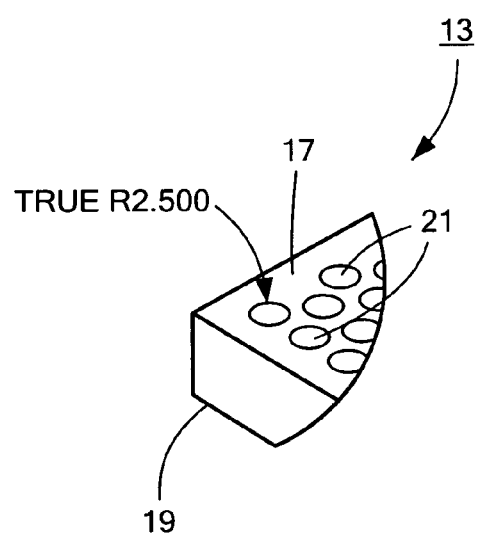

Referring now to FIGS. 2(a) and 2(b), support 13 can be seen to be a generally sheet-like, unitary structure, preferably of high mechanical strength, having a top surface 17 and a bottom surface 19. The thickness of support 13 may vary, depending upon the type of use to which membrane 11 is put and the types of pressures typically encountered by support 13 in such a use. For example, where membrane 11 is used in an electrolyzer, support 13 preferably has a thickness suitable for withstanding pressures of 2000-5000 psi. For most applications, support 13 has a thickness of about 5 μm to 75 μm, preferably about 7.5 μm to 25 μm.

As noted above, support 13 is preferably a rigid member; in addition, support 13 is preferably chemically resistant to acid and water hydrolysis at elevated temperatures. Examples of materials that may be used to make support 13 include, but are not limited to, perfluorinated polymers, polyvinylidene fluoride, poly(tetrafluoroethylene), polybenzimidazole, polyphenylenesulfide, polysulfone, polyethersulfone, polyesters, polyparaphenylene, polyquinoxaline, polyarylketone, polybenzazole, polyaramid, poly(etherether-ketone), liquid crystal polymers, polyimide and polyetherimide. A comparison of the mechanical strength of some of the above-listed polymers to conventional PEM materials is provided below in TABLE I.

TABLE I

| Material, condition | Young's Modulus (Mpa) |
| --- | --- |
| NAFION ® 112 PFSA membrane, dry 20° C. | 300 |
| NAFION ® 112 PFSA membrane, wet 80° C. | 70 |
| Poly(tetrafluoroethylene) (PTFE) | 400 |
| Polybenzimidazole (PBI) | 5900 |
| Polyphenylenesulfide (PPS) | 3300 |
| Polysulfone (PS) | 2600 |
| Poly(etherether-ketone) (PEEK) | 2700 |
| Polyimide (PI) | 2900 |

As can be seen, PBI, PPS, PS, PEEK and PI are substantially stronger than PFSA and PTFE and, therefore, are preferred as materials for use in making support 13.

KAPTON® polyimide (DuPont, Wilmington, Del.), which has a high strength, good hydrolysis stability and excellent thermal properties, is a particularly desirable material for use in making support 13. Ultra-thin membranes of KAPTON® polyimide (8.5 μm and 17 μm) are commercially available and may be used to make support 13. VECTRA® liquid crystal polymers (Goodfellow, Cambridgeshire, UK) also have superb mechanical, chemical and thermal stability and may be used to make support 13.

Although the polymers discussed above as suitable for use in making support 13 are non-ionic, ionomers may alternatively be used. Examples of suitable cationic ionomers include carboxylated, sulfonated or phosphorylated derivatives of the polymers discussed above. Examples of suitable anionic ionomers include amino, imimo, ammonium, sulfonium and phosphonium derivatives of the polymers discussed above.

Support 13 is provided with a plurality of straight-through pores 21, preferably cylindrical in shape, that extend in a direct, i.e. straight-line, fashion from top surface 17 to bottom surface 19. It should be stressed that the base shape of pores 21 can be chosen from any two-dimensional geometric shape distributed in either regular or irregular fashion. As will be discussed further below, pores 21 may be made by a variety of different techniques and may preferably each have a diameter of about 0.1 μm to 200 μm, preferably 0.5 μm to 50 μm. Pores 21 may constitute about 5% to 95%, more preferably about 40% to 60%, of support 13.

The conductance of a membrane including such a porous support can be easily estimated as:

$$\frac{1}{G} = \frac{T_s}{\sigma * A * X} + \frac{(T - T_s)}{\sigma * A}$$

where G is the ionic conductance of the composite membrane, σ is the ionic conductivity of the solid polymer electrolyte, A is the geometric area of the composite membrane, X is the percentage of pores in the support, T is the thickness of the composite membrane and $T_s$ is the thickness of the support.

As can be seen from the above equation, the conductance of the composite membrane is inversely proportional to the percentage of pores in the support. Thus, a support with 50% pores results in a composite membrane with conductance equivalent to a homogenous membrane twice as thick. To maximize the conductance of the supported membrane without a sacrifice in mechanical properties, a support with 50% pores may be fabricated.

Figure 3:
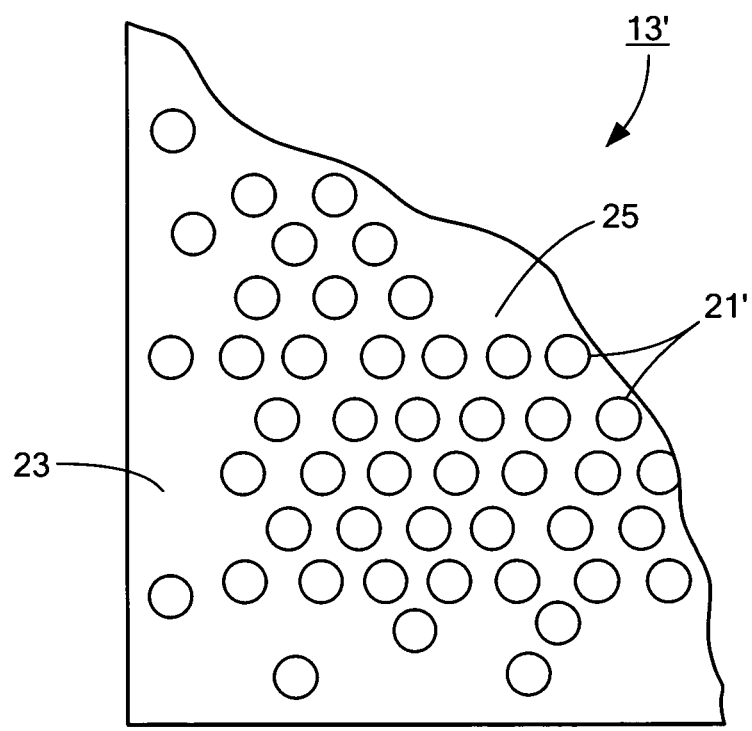
FIG. 3 is a fragmentary top view of a non-electrically-conductive support that may be used as an alternative to the non-electrically-conductive support of FIGS. 2(a) and 2(b)

In the present embodiment, pores 21 are arranged in a uniform hexangular pattern over the entirety of support 13, such pores 21 having, for example, a diameter of about 5 µm and a center-to-center spacing of about 7 µm. It is to be understood, however, that the present invention is not limited to the above-described pattern of pores and may encompass a variety of different patterns of pores. For example, as can be seen in FIG. 3, there is shown a fragmentary top view of a support 13' having a plurality of pores 21' that are arranged so that some pores 21' in a lesser concentration may be found in areas of higher membrane stress (e.g., at the membrane edge 23 or in local "hot spots" 25) and other pores 21' in a greater concentration may be found elsewhere.

Figures 4A, 4B:
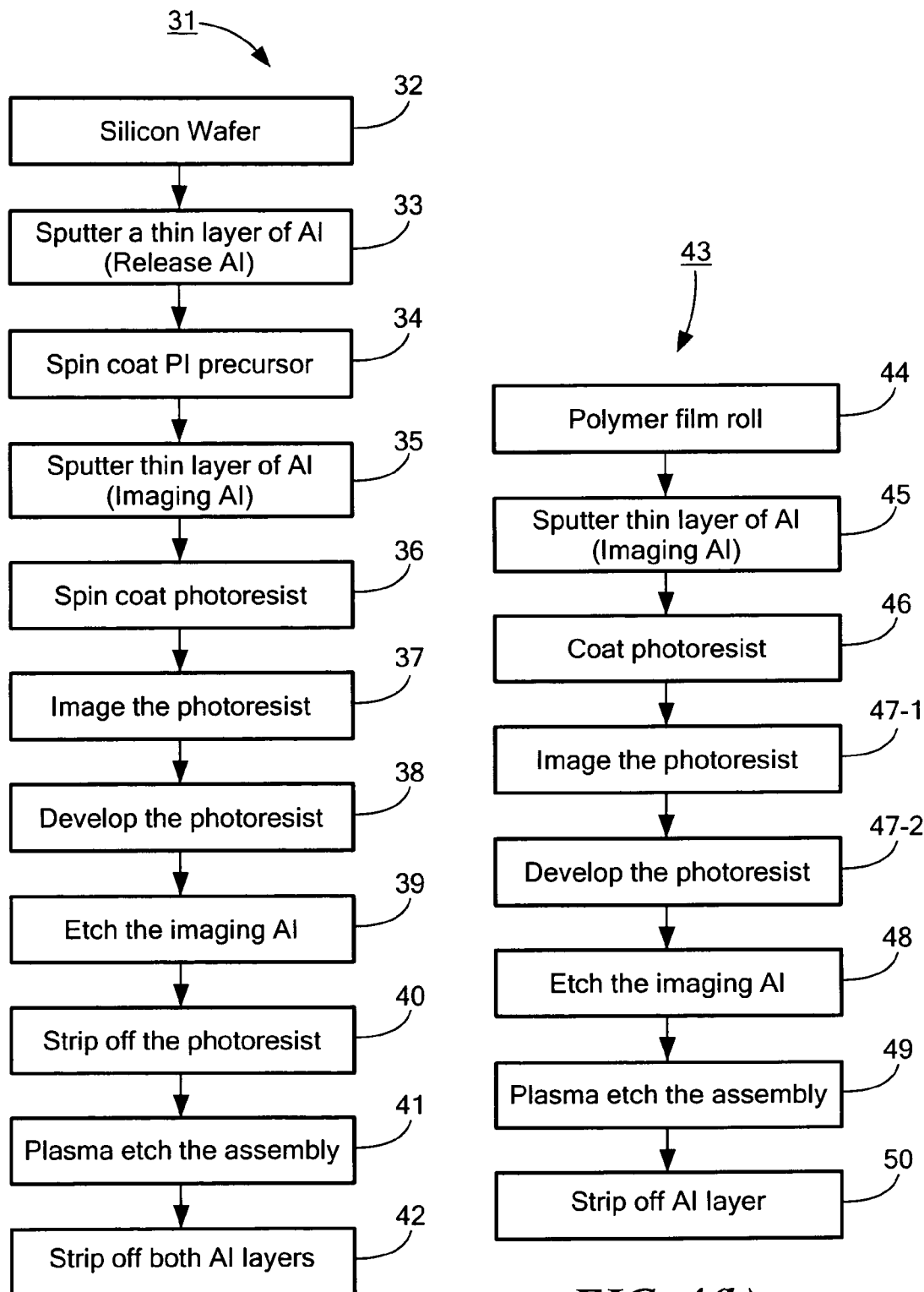
FIGS. 4(a) and 4(b) are schematic depictions of processes for preparing the non-electrically-conductive support of FIG. 1 by plasma dry etching.

Pores 21 may be made by any of a variety of different techniques. One such technique that may be employed is plasma etching. Referring to FIG. 4(a), there is schematically shown an example of a first plasma etching process for forming pores 21 in support 13 (it being understood that said process may also be used to form pores 21' in support 13'), said process being represented generally by reference numeral 31.

As can be seen, process 31 begins in step 32 with the provision of a silicon wafer. (Other flat substrates including flat metal sheets may be used instead of a silicon wafer.) Next, as represented by step 33, a first thin layer of aluminum is sputtered onto the silicon wafer. Next, as represented by step 34, a layer of what will become support layer 13, preferably polyimide, is spin coated onto the aluminum layer. Next, as represented by step 35, a second thin layer of aluminum is sputtered onto the support layer precursor. Next, as represented by step 36, a layer of photoresist material is spin coated onto the second aluminum layer. Next, as represented by steps 37 and 38, the photoresist layer is imaged and then developed, thereby creating pores in the photoresist layer that expose the underlying second aluminum layer. Next, as represented by step 39, the exposed areas of the second aluminum layer are etched with acid, thereby creating pores in the second aluminum layer that expose the underlying support layer. Next, as represented by step 40, the photoresist layer is removed. Next, as represented by step 41, the exposed areas of the support layer are plasma etched. Finally, as represented by step 42, the aluminum layers are removed from the etched support.

It should be understood that, if desired, step 33 may be omitted entirely, with the support layer being deposited directly onto the silicon wafer (or other flat substrate used).

Also, although spin coating is described above as being used to form the support and photoresist layers, direct coating processes may also be used to increase speed and lower cost. Examples of suitable coating techniques include gravure coating, immersion (dip) coating, metering rod (Meyer bar) coating, slot die coating, rotary screen and air knife coating.

One benefit of using plasma etching to create the pores in the support is that one can obtain pores in the micrometer scale, with an aspect ratio in the neighborhood of 8 to 10. At the same time, however, it should be noted that pores formed by plasma etching have tendency to diverge as they pass through a substrate (as opposed to being collimated). Consequently, such pores should not be spaced so closely to one another that they intersect.

Although process 31 is described herein as a batch process, the actual manufacturing process can readily be adapted to a continuous, fully-automated production line. Referring now to FIG. 4(b), there is schematically shown an example of a continuous manufacturing process, said process being represented generally by reference numeral 43.

Process 43 begins with the support precursor being provided in roll form, as represented by step 44. Next, as represented by step 45, a thin layer of aluminum is sputtered onto the support roll. Next, as represented by step 46, a layer of photoresist is coated onto the aluminum layer. Next, as represented by steps 47-1 and 47-2, the photoresist is image and developed, respectively, to expose portions of the underlying aluminum layer. Next, as represented by step 48, the aluminum layer is acid etched to expose portions of the underlying support layer. Next, as represented by step 49, the support layer is plasma etched. Finally, as represented by step 50, the aluminum layer is removed from the etched support.

Instead of forming pores 21 (or 21') by plasma etching, such pores may also be formed by other techniques, such as laser micromachining, micromolding, or chemical etching. Laser micromachining is disclosed, for example, in U.S. Patent Application Publication No. US 2006/0065521 A1, inventors Liu et al., published Mar. 30, 2006, which is incorporated herein by reference. Laser micromachining typically involves lasing support 13 with suitable laser light to create pores 21 (or 21'). Although either gas lasers or solid state lasers may be used to create pores 21, gas lasers are preferred. Within the class of gas lasers, excimer lasers are preferred over $CO_2$ lasers. This is because excimer lasers typically produce laser light having a much shorter wavelength than that produced by $CO_2$ lasers (~0.3 µm for an excimer laser vs. ~10 µm for a $CO_2$ laser). Consequently, because of their shorter wavelengths, excimer lasers directly excite the covalent bonds of the support and decompose the support without creating as extreme high-temperature conditions as is typically the case with $CO_2$ lasers. Additionally, due to their shorter wavelengths, excimer lasers can create significantly smaller pores than $CO_2$ lasers typically do. Excimer laser micromachining is an effective controlled method to fabricate a porous support structure having uniform pore displacements with narrow pore size distribution.

Where a $CO_2$ laser is used to micromachine pores into the support, the whole laser beam is typically focused onto an area of the support until the irradiated area is ablated. Where an excimer laser is used, the relatively uniform beam intensity produced thereby provides an alternative approach to pore formation: near-field imaging. In near-field imaging, a mask having a pattern is placed in the path of the beam emitted by the excimer laser. The light transmitted through the pattern of the mask is then focused by an imaging lens onto the support, resulting in the mask pattern being projected onto the support, with a corresponding pattern of pores being formed in the support. As can readily be appreciated, near-field imaging enables various alternative patterns to be projected onto the support simply by using differently patterned masks.

Based on the mask employed, the pore size may be 30 μm and the wall thickness may be 10 μm, which corresponds to a 50% overall opening. It is challenging to reduce the 30-micrometer (μm) holes to a 5- to 10-μm diameter as may typically be achieved using plasma-etched processes. A pattern with smaller holes is highly desirable. Two masks that were used for creating new patterns with smaller holes are as follows: (1) Mask I: hole diameter 40 μm, wall thickness 8 μm; and (2) Mask II: hole diameter 80 μm, wall thickness 28 μm. KAPTON® polyimide films with nominal thicknesses of ⅓ mil (~8.5 μm) and ⅔ mil (~17 μm) were processed with the above-described excimer laser and masks. The ⅓ mil KAPTON® polyimide film was 9 μm thick, which was slightly thicker than specified, and the ⅔ mil KAPTON® polyimide film was 15 μm, which was as thick as expected. The entrance diameter was 11 μm for both samples. The exit diameter was 7 μm for the ⅓ mil KAPTON® polyimide film and 4.5 μm for the ⅔ mil KAPTON® polyimide film. These values correspond to wall angles of 77.5° and 77.8°, respectively. It is also feasible to prepare microporous composite film substrates of 1 mil (25 μm). The preferred porosity for the above films is 40 to 50%, with a range of 40 to 60%.

Micromolding is an alternative fabrication method to plasma etching or laser micromachining for preparing a microporous substrate with controlled straight pores. The entire micromachining fabrication process is based on the conventional phase-inversion membrane formation method, which has been commercially utilized to produce filtration membranes for decades. To summarize the process, a micromold is first prepared from silicone rubber (polydimethylsiloxane, PDMS) by soft-lithography or silicon wafer by Deep Reactive Ion Etch (DRIE) technology. A polymer solution is then cast onto the mold. The whole assembly is then exposed to saturated water vapor, where the solvent is evaporated partially to expose the land area of the mold. To obtain the final product, the assembly is submerged in water and the polymer is solidified.

The micromold is made of PDMS, which is flexible yet offers excellent durability. The micromolds are of great precision with minimal defect rate. The pore size dimension of a polysulfone (PSU) support structure fabricated from the PDMS micromolds is very close to that achieved with laser micromachining; however, the definition of the holes is not as uniform as the sample prepared from the laser micromachining. This arises because the PDMS is drastically softer than the PSU material. For the purpose of a support structure, the definition is more than sufficient. Certain holes, when using the micromolding process, may be partially covered by a thin skin. Since the skin is <0.5 μm in thickness, it can be easily removed by ultrasonification or oxygen plasma treatment.

Pores 21 (or 21') may also be made by combinations of the various techniques described above and/or other techniques, with some pores being made by one technique and other pores being made by one or more other techniques. For example, one could form the peripheral pores by plasma etching and could form the non-peripheral or central pores by laser micromachining.

Referring back to FIG. 1, solid polymer electrolyte 15 can be seen to fill pores 21 and to cover thinly top surface 17 and bottom surface 19 of support 13. Examples of suitable materials for use as solid polymer electrolyte 15 include (i) polymer compositions that contain metal salts; (ii) polymeric gels that contain electrolytes; and (iii) ion exchange resins. In general, if proton conductivity is required, a carboxylated, sulfonated or phosphorylated polymer is preferably used as solid polymer electrolyte 15. If hydroxyl ions are needed, a polymer containing amino, imimo, ammonium, sulfonium, and phosphonium groups is preferably used as solid polymer electrolyte 15. To enhance the ionic conductivity of membrane 11, inorganic ionically-conductive materials, such as metal oxide (e.g., $TiO_2$), silicon oxide, metal phosphates (e.g., zirconium phosphate) or heteropolyacids, may be impregnated into the solid polymer electrolyte 15.

A preferred material for use as solid polymer electrolyte 15 is a perfluorosulfonic acid (PFSA) membrane, such as is commercially available from DuPont (Wilmington, Del.) as NAFION® PFSA polymer. Of the aforementioned NAFION® PFSA polymers, particularly preferred are those having an equivalent weight of 200 to 2000, even more preferably those having an equivalent weight of 500 to 1200, the optimal equivalent weight depending on the use to which membrane 11 is applied.

In a preferred embodiment, solid polymer electrolyte 15 may comprise a dispersed reduced noble metal or noble metal oxide. The aforementioned noble metal may be selected from the group consisting of platinum, palladium, rhodium, ruthenium, and iridium, with platinum being preferred. A solid polymer electrolyte with a dispersed reduced noble metal or noble metal oxide may be prepared, for example, by ion exchange of noble metal ions, such as $Pt^{+2}$ ions (where platinum is the subject noble metal), into a solid polymer electrolyte membrane and subsequent reduction of the noble metal ions to dispersed metal particles, such as Pt black particles, within the solid polymer electrolyte membrane. Where platinum is the noble metal in question, the result is a platinized membrane that simultaneously (1) catalytically reacts most of the hydrogen and oxygen gas reaction products permeating through the membrane and (2) destroys harmful peroxide free radical species (hydroxyl radical, HO.) formed by the interaction of the cell generated permeating gas (e.g., hydrogen) reacting with the corresponding cell generated gas (e.g., oxygen) at the electrochemical cell catalyst/polymer electrolyte interface. In an alternative embodiment, certain metal ions known to destroy peroxide-free radical species, such as $cerium^{+3}$ ions and $manganese^{+4}$ ions, can be exchanged into the platinized or non-platinized solid polymer electrolyte material to assist in free radical destruction.

Solid polymer electrolyte 15 may be incorporated into support 13 by a membrane extrusion technique. Such a technique may comprise providing the solid polymer electrolyte in the form of a thin membrane, stacking the thin ionomer membrane on the top and/or bottom surfaces of support 13, and then pressing the stack together at an elevated pressure, preferably above the melting point or glass transition temperature of the ionomer, until the solid polymer electrolyte is caused to fill the pores of support 13. In accordance with this technique, the solid polymer electrolyte may be, for example, a cast film of a perfluorocarbon sulfonic acid membrane (e.g., NAFION® 212 PFSA having a dry membrane thickness of 0.002 inch (2 mil) before processing or NAFION® 211 PFSA having a dry membrane thickness of 0.001 inch (1 mil) before processing). Such membranes may be ion-exchanged with $Pt^{+2}$ ions using, for example, solutions containing platinum tetraamine chloride or platinum diammino dinitro nitrate or other $Pt^{+2}$ species and subsequently reduced using, for example, sodium borohydride to Pt black to form a non-electrically-conducting, dispersed layer of the Pt black within the solid polymer electrolyte membrane, i.e., a platinized membrane. A dimensionally-stable, porous support structure may be inserted between two such platinized membranes and thermally pressed at elevated pressures to fill the pores of the support with the platinized membranes, thereby forming a dimensionally-stable composite membrane. In an alternative embodiment, prior to laminating (bonding) the rigid, dimensionally-stable, porous support structure and the membrane, the platinized membrane may be expanded by boiling-water treatment or by soaking in an ambient-temperature (20-30° C.) alcohol/water solution (e.g., 4 parts water:1 part alcohol) for 1 to 8 hours. The expanded membrane may then be mechanically-restrained in a suitable clamped test fixture and allowed to dry. This process enhances the mechanical stability of the membrane by minimizing, when soaked in water, expansion in the x-y direction and complements the mechanical stability that is realized when the membrane is bonded to the rigid, mechanically-stable, porous support structure.

Various other techniques may be used to couple solid polymer electrolyte 15 to support 13. One such technique involves providing the solid polymer electrolyte in the form of a solution/dispersion (e.g., NAFION® 1100 PFSA in water or isopropanol), dispersing some Pt black particles in the solution/dispersion (e.g., 2-20% by weight Pt, 80-98% by weight ionomer) and then coating support 13 with said solution/dispersion. Examples of suitable coating techniques include gravure coating, immersion (dip) coating, metering rod (Meyer bar) coating, slot die coating, rotary screen and air knife coating. The optimal coating technique for any particular case will depend on factors, such as instrument complexity, thickness accuracy, operation efficiency, initial investment, and the like. After the solution/dispersion is coated onto the support, the coated support may be heated at about 50° C. to 100° C., preferably 80° C., for about 5 minutes to evaporate the solvent and subsequently to 100 to 200° C. to cure the solid polymer electrolyte. If desired, one or more additional coatings may thereafter be applied. Said one or more additional coatings either may be of the same solution/dispersion previously applied in order to build up the thickness of the solid polymer electrolyte or may be different from the initial solution/dispersion in order to obtain a composite membrane with a multilayer electrolyte structure having desired properties. After coating and drying each applied layer or after coating and drying all applied layers, the layer or layers are preferably cured by heating at a temperature greater than the glass transition temperature of the ionomer (e.g., 100° C. to 400° C., preferably 160° C. for 15 minutes). Such curing, which serves to sinter or anneal the ionomer, further enhances the mechanical properties of the membrane.

As an alternative to coating, the solid polymer electrolyte may be applied by spraying the polymer electrolyte solution/dispersion onto support 13. Conventional spraying techniques may be used for this purpose. Such spraying is preferably performed at 80° C. and does not require a subsequent solvent evaporation step. Micro-spraying may be used to create solid polymer electrolyte patches on the support, such patches, if desired, being far smaller than those capable of being produced by masked coating techniques.

Figure 5:
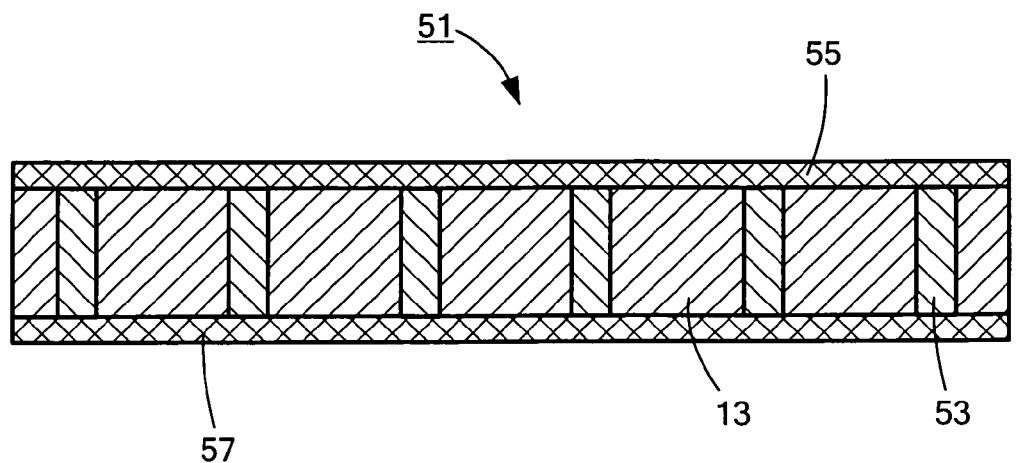
FIG. 5 is a schematic section view of a second embodiment of a solid polymer electrolyte composite membrane constructed according to the teachings of the present invention.

An example of a composite membrane with a multilayer electrolyte structure as discussed above is shown in FIG. 5 and is represented generally therein by reference number 51. Membrane 51 comprises a support 13, a first solid polymer electrolyte 53 (which may be identical to solid polymer electrolyte 15) filling the pores of support 13, a second polymer electrolyte 55 coating a top surface of support 13, and a third polymer electrolyte 57 coating a bottom surface of support 13. Electrolytes 53, 55 and 57 may be identical to one another, or one or more of electrolytes 53, 55 and 57 may differ from one another. In addition, one or more of solid polymer electrolytes 53, 55 and 57 may include a dispersed reduced noble metal or noble metal oxide. According to one method of fabrication, the pores of support 13 may be filled with electrolyte 53 and then electrolytes 55 and 57 may be applied to the top and bottom surfaces, respectively, of support 13. Alternatively, without previously filling the pores of support 13, electrolytes 55 and 57 may be applied to the top and bottom surfaces, respectively, of support 13, and then subjected to pressure, with the pores of support 13 thereby becoming filled with electrolytes 55 and 57 to collectively form electrolyte 53.

Figure 6:
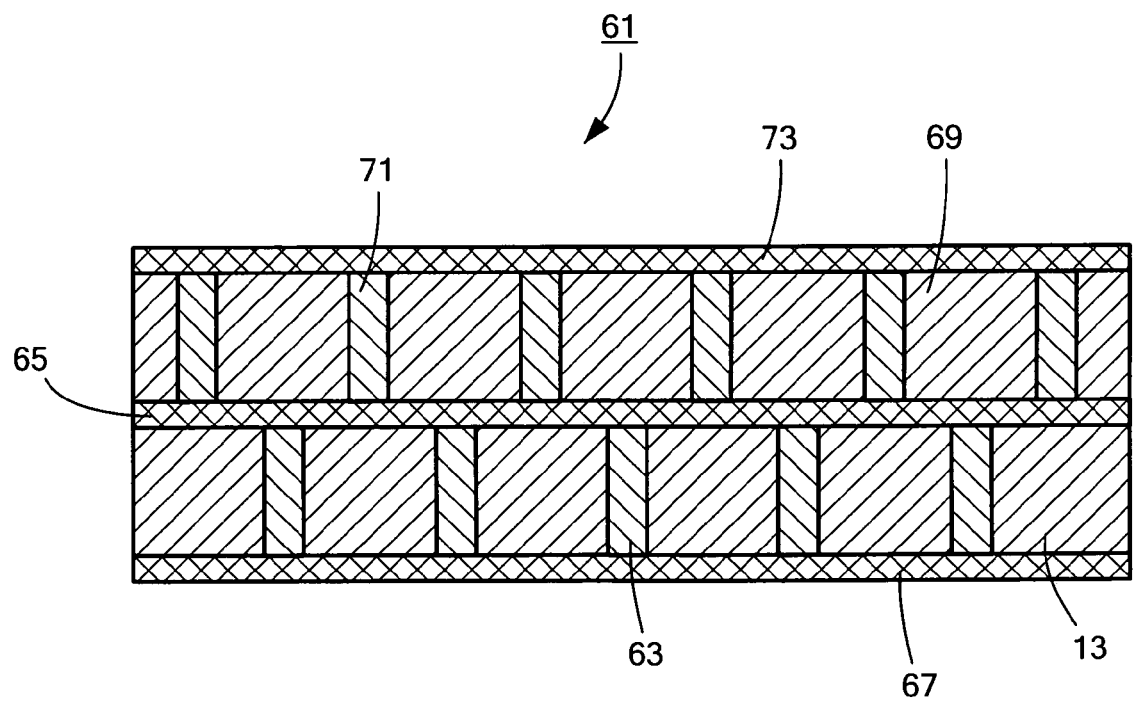
FIG. 6 is a schematic section view of a third embodiment of a solid polymer electrolyte composite membrane constructed according to the teachings of the present invention.

Another example of a composite membrane with a multilayer electrolyte structure is shown in FIG. 6 and is represented generally therein by reference number 61. Membrane 61 comprises a support 13, a first solid polymer electrolyte 63 filling the pores of support 13, a second polymer electrolyte 65 coating a top surface of support 13, a third polymer electrolyte 67 coating a bottom surface of support 13, a second support 69 on top of second polymer electrolyte 65, a fourth polymer electrolyte 71 filling the pores of support 69, and a fifth polymer electrolyte 73 coating a top surface of support 69. Electrolytes 63, 65, 67, 71 and 73 may be identical to one another, or one or more may differ from one another. In addition, one or more of solid polymer electrolytes 63, 65, 67, 71 and 73 may include a dispersed reduced noble metal or noble metal oxide. According to one method of fabrication, the pores of supports 13 and 69 may be filled with electrolytes 63 and 71 and then electrolytes 65, 67 and 73 may be applied to supports 13 and 69. Alternatively, without previously filling the pores of supports 13 and 69, electrolytes 65, 67 and 73 may be applied to supports 13 and 69 and then subjected to pressure, with the pores of support 13 becoming filled with electrolytes 65 and 67 to collectively form electrolyte 63 and with the pores of support 69 becoming filled with electrolytes 65 and 73 to collectively form electrolyte 71.

If desired, mask coating technology may be used to create a composite membrane wherein the solid polymer electrolyte is confined to certain patches or regions.

The total thickness of membrane 11 is preferably about 5 to 300 μm, more preferably 10 to 75 μm, with the thickness of the membrane being governed by application requirements. Generally, a water electrolyzer requires a thicker membrane due to its high differential pressure while an ultra-thin membrane is suitable for fuel cells since low pressure is typically involved for their operation.

Membrane and electrode assemblies (MEAs) comprising the composite membrane of the present invention can be fabricated by pressing a precast film of Pt-supported on carbon/ionomer ink onto each side of the composite membrane. The foregoing method is typically referred to as the decal transfer method.

One of the advantages of the composite membrane of the present invention is that catalyst ink can be directly coated or sprayed onto the top and bottom surfaces of the membrane. This direct coating of the catalyst ink is not practical for conventional ionomer membranes since such membranes change dimension when contacted with the ink. Since the composite membrane of the present invention has excellent dimensional stability when contacted with swelling agents, such as water or alcohols, the catalyst ink can be directly applied to the membrane.

Another approach that may be used to fabricate an MEA using the composite membrane of the present invention involves a technique called "catalyst on diffusion media." The diffusion medium of this technique is a porous electrically-conductive material, which is typically in the form of a thin sheet (e.g., teflonated porous carbon paper). Optionally, a microporous layer prepared from carbon black and a polymer binder may be applied to the diffusion medium. The catalyst is then sprayed onto the diffusion medium to form a diffusion electrode. A catalyst-loaded diffusion electrode is then pressed onto each side of the composite membrane to form a full MEA.

Such an MEA may be used, for example, by being sandwiched between two pieces of teflonated porous carbon paper and assembled into a functional PEM fuel cell as described in U.S. Pat. No. 4,215,183, inventor MacLoed, which issued Jul. 29, 1980, the disclosure of which is incorporated herein by reference, or by being sandwiched between porous titanium metal meshes or sinters and assembled into an electrolysis cell as described in U.S. Pat. No. 6,500,319, inventors LaConti et al., which issued. Dec. 31, 2002, the disclosure of which is incorporated herein by reference.

The following Examples are merely illustrative and do not limit in any way the present invention:

Example 1

Platinization of NAFION® 212 or 211 PFSA Membrane

The following is a description of a process that may be used for platinization of a NAFION® 212 or 211 PFSA membrane. First, a NAFION® 212 or 211 PFSA membrane is hydrated in 100° C. deionized water. Next, a 2 g/L solution of tetra-amine platinum chloride (~5 mL/in² of membrane to be platinized) is prepared. The membrane is then exchanged in the aforementioned solution for a minimum of 30 minutes. Next, the exchanged membrane containing the $Pt^{+2}$ ions is rinsed thoroughly with deionized water. Next, a 10 g/L solution of sodium borohydride (enough to cover the membrane in the tray used) is prepared. The membrane is then placed into the aforementioned sodium borohydride solution, and the exchanged membrane containing the $Pt^{+2}$ ions is chemically reduced for ~4 minutes or until uniformly black. Next, the platinized membrane is removed from the sodium borohydride solution and is placed in deionized water. Next, the platinized membrane is rinsed and removed from the water and then wiped on a flat surface with lint-free paper towels to remove surface platinum. The platinized membrane is then exchanged 3 more times in deionized water and then exchanged 2 times in 1.5 N sulfuric acid to convert it to hydrogen ($H^+$) ion form. Next, the membrane is rinsed in deionized water and then hydrated in 100° C. deionized water.

Example 2A

Restrain-Drying of NAFION® 212 or 211 Membrane Boiling-Water Pretreatment

First, a platinized and fully hydrated membrane prepared in the above-described manner is placed onto a flat plastic sheet covered with a piece of TEFLON® PTFE. With a wet lint-free paper towel, the membrane is flattened out over a support plate. A suitably-sized plastic frame is then placed over the membrane and clamped in place. The clamped membrane is then placed in a clean, dry area and air-dried for 24 hours or longer (drying can be hastened by placing into a desiccator cabinet). The membrane is then removed from the frame and is trimmed to the inner diameter (I.D.) of the frame used to restrain. The membrane is then ready for pressing.

Example 2B

Ambient-Temperature Alcohol/Water Treatment

Alternatively to the process of Example 2A, enhanced expansion of the membrane can be achieved by soaking the platinized membrane in a solution of alcohol and water (which may be, for example, a mixture of 4 parts deionized water to 1 part isopropyl alcohol) for ~30 minutes and then restraining the membrane in the manner described above. This may yield a thinner membrane with potentially better performance values.

Example 3

Single-Porous Substrate, Composite Platinized Membrane

First, two suitably-sized pieces of platinized membrane that have been restrain-dried are taken. Then, one piece of the dried platinized membrane is placed into a pressing mold. Next, a piece of the porous substrate is centered over the platinized membrane, followed by the second piece of platinized membrane. The assembly is then placed into the mold, transferred to 400° F. press, and the press is turned up to 500 psi based on the I.D. of the mold. The mold is held at temperature and pressure for 35 minutes and then cooled to room temperature under pressure. The mold is then removed from the press, and the porous substrate, composite platinized membrane is taken out of the mold. The membrane is now ready for membrane-electrode assembly (MEA) fabrication.

Example 4

Double-Porous Substrate, Composite Platinized Membrane

First, three pieces of membrane per processing, platinizing and restraining procedures are prepared. Next, two pieces of porous substrate material are cut to the proper size. One of the three pieces of membrane is placed into a pressing mold, and a porous substrate is placed over the membrane. (The grain orientation of the substrate should be noted.) A second of the three pieces of membrane is then centered over the porous substrate. A second porous substrate is then placed over the second piece of membrane with the grain oriented 90° to the previous porous substrate. The third of the three pieces of membrane is then placed over the second porous substrate, followed by a piece of PFA/PTFE (perfluoroalkoxy fluorocarbon/polytetrafluoroethylene), in that order. Next, the mold is placed into a 400° F. press, and the pressure in the press is turned up to 500 psi based on the I.D. of the mold. The temperature and pressure are held constant for 35 minutes, and then the temperature is cooled down to room temperature under pressure. The mold is removed from the press, and the porous substrate membrane is taken out of the mold. The membrane is now ready for membrane-electrode assembly (MEA) fabrication.

Example 5

Fabrication of a Platinized Composite Membrane with Spray or Cast Method

A porous substrate is placed onto a heated aluminum plate that is controlled at ~70° C. (the substrate being taped to the plate with SCOTCH® adhesive tape or equivalent). A solution of 20% by weight platinum/80% by weight NAFION® PFSA is prepared. The solution is then diluted to a desired consistency for spraying or casting with an alcohol/water solution. (Process described below is for spray method.) The solution is then sonified for ~1 minute and then placed into a thin-layer chromatography (TLC) sprayer of suitable size.

The sprayer is then hooked up to a tank of nitrogen gas, and the solution is sprayed onto the heated substrate at ~3 psi until a uniform coat is applied. The coating is then allowed to dry. The aforementioned steps of spraying and drying are then repeated until a coating of desired thickness is attained. The porous substrate structure is then turned over and the above-described coating process is repeated. Next, the porous substrate membrane is removed from the hot plate after drying thoroughly and is placed into 105° C. oven for 30 minutes. (While heating in the oven, the membrane is preferably covered with a MYLAR® polyester sheet to prevent curling.) Next, the membrane is placed between two pieces of PFA film in a mold and is then pressed at 350° F. for 10 minutes at pressure. The assembly is then cooled to room temperature under pressure. The mold is then removed from the press, and the membrane is removed from the mold. The porous substrate membrane is now ready for MEA fabrication.

Example 6

Water Electrolysis Performance Testing

All electrolysis cell testing was performed using composite membranes having thermal-pressure-bonded integral Pt—Ir anode catalyst (4 mg/cm$^2$) and Pt black cathode catalyst (4 mg/cm$^2$). Porous support thickness was 25 microns. Testing was conducted at 80° C., balanced pressure from 0 to 400 psi, and liquid water anode feed.

Cell A: An electrolysis cell was assembled using a composite membrane made up of: plantinized NAFION® 211 PFSA/support structure/platinized NAFION® 211 PFSA using the processes of Examples 1, 2A and 3. The water electrolysis performance for Cell A is shown in Table II.

Cell B: An electrolysis cell was assembled using a composite membrane made up of: sprayed layer of PFSA 830 equivalent weight (EW) ionomer-Pt black/support structure/sprayed layer of PFSA 830 EW ionomer-Pt black using the process of Example 5. The water electrolysis performance for Cell B is shown in Table II.

Cell C: An electrolysis cell was assembled using a composite membrane made up of: plantinized NAFION® 211 PFSA/support structure/non-platinized NAFION® 212 PFSA/support structure/plantinized NAFION® 211 using the processes of Examples 1, 2B and 4. The water electrolysis performance for Cell A is shown in Table II.

TABLE II

| | Cell Voltage (V) | | |
| --- | --- | --- | --- |
| Current Density (mA/cm$^2$) | Cell A 0 psi | Cell B 400 psi* | Cell C 200 psi* |
| 200 | 1.49 | 1.52 | 1.55 |
| 400 | 1.53 | 1.55 | 1.58 |
| 600 | 1.57 | 1.58 | 1.62 |
| 800 | 1.60 | 1.59 | 1.65 |
| 1000 | 1.63 | 1.61 | 1.68 |
| 1200 | 1.66 | 1.63 | 1.71 |
| 1400 | 1.69 | 1.65 | 1.74 |
| 1600 | 1.72 | 1.67 | 1.77 |
| 1800 | 1.75 | 1.69 | — |
| 2000 | 1.77 | 1.70 | — |

*Balanced pressures
Note:
The typical hydrogen permeating through the platinized composite membrane MEAs from the hydrogen cathode side (e.g., at 200 to 400 psi hydrogen gas pressures) to the oxygen anode side was in the concentration range of 200 to 600 ppm H$_2$ in the evolved oxygen, which is up to two orders of magnitude lower than for similar thickness, non-plantinized NAFION ® 212 PFSA membranes.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A solid polymer electrolyte composite membrane, said solid polymer electrolyte composite membrane comprising:
    (a) a first non-electrically-conductive support, said first non-electrically-conductive support having opposing top and bottom surfaces, a plurality of pores being provided in said first non-electrically-conductive support, said pores extending directly from said top surface to said bottom surface, wherein said pores are unevenly distributed in said first non-electrically-conductive support, with at least some of said pores being located in a peripheral portion of said first non-electrically-conductive support and at least some of said pores being located in a non-peripheral portion of said first non-electrically-conductive support, said pores being located in a greater concentration in said non-peripheral portion than in said peripheral portion; and
    (b) at least some of said pores being at least partially filled with a first solid polymer electrolyte, said first solid polymer electrolyte being non-conductive to electrons and comprising a dispersed reduced noble metal or noble metal oxide.

2. The solid polymer electrolyte composite membrane as claimed in claim 1 wherein said pores are cylindrical in shape.

3. The solid polymer electrolyte composite membrane as claimed in claim 1 wherein said first non-electrically-conductive support is selected from the group consisting of perfluorinated polymers, polyvinylidene fluoride, poly(tetrafluoroethylene), polybenzimidazole, polyphenylenesulfide, polysulfone, polyethersulfone, polyesters, polyparaphenylene, polyquinoxaline, polyarylketone, polybenzazole, polyaramid, poly(etherether-ketone), liquid crystal polymers, polyimide and polyetherimide.

4. The solid polymer electrolyte composite membrane as claimed in claim 3 wherein said first non-electrically-conductive support is selected from the group consisting of polysulfone, liquid crystal polymers, polyimide and polybenzimidazole.

5. The solid polymer electrolyte composite membrane as claimed in claim 1 wherein said noble metal is selected from the group consisting of platinum, palladium, rhodium, ruthenium, and iridium.

6. The solid polymer electrolyte composite membrane as claimed in claim 1 wherein said first solid polymer electrolyte comprises a perfluorocarbon sulfonic acid ionomer.

7. The solid polymer electrolyte composite membrane as claimed in claim 1 wherein said first solid polymer electrolyte comprises a platinized perfluorocarbon sulfonic acid ionomer.

8. The solid polymer electrolyte composite membrane as claimed in claim 7 wherein the platinized perfluorocarbon sulfonic acid ionomer is fabricated by Pt$^{+2}$ exchange into a solid polymer electrolyte and subsequent reduction to dispersed platinum black, whereby the solid polymer electrolyte contains up to 10% by weight platinum.

9. The solid polymer electrolyte composite membrane as claimed in claim 7 wherein the platinized perfluorocarbon sulfonic acid ionomer is fabricated by forming a film a dispersion of an alcohol and water with dissolved perfluorocarbon ionomer and platinum black, whereby the solid polymer electrolyte contains up to 20% by weight platinum.

10. The solid polymer electrolyte composite membrane as claimed in claim 1 wherein said pores have a diameter of about 0.1 microns to about 200 microns.

11. The solid polymer electrolyte composite membrane as claimed in claim 1 wherein said pores constitute about 40% to about 60%, by volume, of said first non-electrically-conductive support.

12. The solid polymer electrolyte composite membrane as claimed in claim 1 further comprising a second solid polymer electrolyte positioned at least one of over the top surface and under the bottom surface of said first non-electrically-conductive support.

13. The solid polymer electrolyte composite membrane as claimed in claim 12 wherein said first solid polymer electrolyte and said second solid polymer electrolyte are identical in composition.

14. A solid polymer electrolyte composite membrane, said solid polymer electrolyte composite membrane comprising:
   (a) a first non-electrically-conductive support, said first non-electrically-conductive support having opposing top and bottom surfaces, a plurality of pores being provided in said first non-electrically-conductive support, said pores extending directly from said top surface to said bottom surface, wherein said pores are unevenly distributed in said first non-electrically-conductive support, with at least some of said pores being located in a peripheral portion of said first non-electrically-conductive support and at least some of said pores being located in a non-peripheral portion of said first non-electrically-conductive support, said pores being located in a greater concentration in said non-peripheral portion than in said peripheral portion;
   (b) at least some of said pores being at least partially filled with a first solid polymer electrolyte, said first solid polymer electrolyte being non-conductive to electrons and comprising a dispersed reduced noble metal or noble metal oxide; and
   (c) a second solid polymer electrolyte positioned at least one of over the top surface and under the bottom surface of said first non-electrically-conductive support, said second solid polymer electrolyte being non-conductive to electrons;
   (d) wherein said first solid polymer electrolyte and said second solid polymer electrolyte are different in composition.

15. The solid polymer electrolyte composite membrane as claimed in claim 1 wherein said first non-electrically-conductive support is non-electrolytically-conductive.

16. A method of preparing a solid polymer electrolyte composite membrane, said method comprising the steps of:
   (a) providing a non-electrically-conductive support, said non-electrically-conductive support having opposing top and bottom surfaces;
   (b) creating a plurality of pores in said non-electrically-conductive support, said pores extending directly from said top surface to said bottom surface, wherein said pores are unevenly distributed in said non-electrically-conductive support, with at least some of said pores being located in a peripheral portion of said non-electrically-conductive support and at least some of said pores being located in a non-peripheral portion of said non-electrically-conductive support, said pores being located in a greater concentration in said non-peripheral portion than in said peripheral portion; and
   (c) at least partially filling at least some of said pores with a first solid polymer electrolyte, said first solid polymer electrolyte comprising a dispersed reduced noble metal or noble metal oxide.

17. The method as claimed in claim 16 wherein said non-electrically-conductive support is selected from the group consisting of perfluorinated polymers, polyvinylidene fluoride, poly(tetrafluoroethylene), polybenzimidazole, polyphenylenesulfide, polysulfone, polyethersulfone, polyesters, polyparaphenylene, polyquinoxaline, polyarylketone, polybenzazole, polyaramid, poly(etherether-ketone), liquid crystal polymers, polyimide and polyetherimide.

18. The method as claimed in claim 17 wherein said non-electrically-conductive support is selected from the group consisting of polysulfone, liquid crystal polymers, polyimide and polybenzimidazole.

19. The method as claimed in claim 16 wherein said noble metal is selected from the group consisting of platinum, palladium, rhodium, ruthenium, and iridium.

20. The method as claimed in claim 16 wherein said pores are created by at least one of plasma etching, laser micromachining, micromolding, and chemical etching.

21. The method as claimed in claim 16 wherein said at least partially filling step comprises positioning a first solid polymer electrolyte film over the top surface of said non-electrically-conductive support and positioning a second solid polymer electrolyte film under the bottom surface of said non-electrically-conductive support so as to form a multilayer structure, wherein at least one of said first solid polymer electrolyte film and said second polymer electrolyte film comprises a dispersed reduced noble metal or noble metal oxide, and then subjecting the multilayer structure to elevated temperature and pressure sufficient to cause at least one of said first solid polymer electrolyte film and said second solid polymer electrolyte film to at least partially fill at least some of the pores.

22. The method as claimed in claim 21 wherein only one of said first solid polymer electrolyte film and said second polymer electrolyte film comprises a dispersed reduced noble metal or noble metal oxide.

23. The method as claimed in claim 16 wherein said first solid polymer electrolyte comprises a platinized perfluorocarbon ionomer.

24. The method as claimed in claim 23 wherein said platinized perfluorocarbon ionomer is fabricated by $Pt^{+2}$ exchange into a perfluorocarbon ionomer and subsequent reduction to dispersed platinum black.

25. The method as claimed in claim 24 wherein said $Pt^{+2}$ exchange is performed by soaking the perfluorocarbon ionomer in a solution comprising at least one of platinum tetraamine chloride and platinum diammino dinitro nitrate.

26. The method as claimed in claim 23 wherein said platinized perfluorocarbon ionomer is fabricated by preparing a dispersion of a perfluorocarbon ionomer and platinum black in a mixture of alcohol and water and then forming a coating with said dispersion.

27. A method of preparing a solid polymer electrolyte composite membrane, said method comprising the steps of:
   (a) providing a first non-electrically-conductive porous support, said first non-electrically-conductive porous support having opposing top and bottom surfaces and a plurality of pores extending directly from said top surface to said bottom surface, wherein said pores are unevenly distributed in said first non-electrically-conductive porous support, with at least some of said pores being located in a peripheral portion of said first non-electrically-conductive porous support and at least some of said pores being located in a non-peripheral portion of said first non-electrically-conductive porous support, said pores being located in a greater concentration in said non-peripheral portion than in said peripheral portion;

(b) providing a first solid polymer electrolyte film, said first solid polymer electrolyte film being non-conductive to electrons;

(c) providing a second solid polymer electrolyte film, said second solid polymer electrolyte film being non-conductive to electrons;

(d) positioning said first non-electrically-conductive porous support on top of said first solid polymer electrolyte film and said second solid polymer electrolyte film on top of said first non-electrically-conductive porous support to form a stack; and (e) compressing said stack under elevated temperatures until at least some of said pores in said first non-electrically-conductive porous support become at least partially filled with at least one of said first solid polymer electrolyte film and said second solid polymer electrolyte film;

(f) at least one of said first solid polymer electrolyte film and said second solid polymer electrolyte film comprises a dispersed reduced noble metal or noble metal oxide.

28. The method as claimed in claim 27 further comprising the steps of providing a second non-electrically-conductive porous support, said second non-electrically-conductive porous support having opposing top and bottom surfaces and a plurality of pores extending directly from said top surface to said bottom surface, and providing a third solid polymer electrolyte film, wherein said stack further comprises said second non-electrically-conductive porous support positioned on top of said second solid polymer electrolyte film and said third solid polymer electrolyte film positioned on top of said second solid polymer electrolyte film, and wherein said compressing step also causes at least some of said pores in said second non-electrically-conductive porous support to become at least partially filled with at least one of said second solid polymer electrolyte film and said third solid polymer electrolyte film.

29. The method as claimed in claim 28 wherein said first non-electrically-conductive porous support and said second non-electrically-conductive porous support are oriented 90° to one another.

30. A solid polymer electrolyte composite membrane prepared by the method of claim 27.

31. The solid polymer electrolyte composite membrane as claimed in claim 1 wherein at least some of said pores are completely filled with said first solid polymer electrolyte.

\* \* \* \* \*